United States Patent [19]

Goda

[11] Patent Number: 6,074,451
[45] Date of Patent: Jun. 13, 2000

[54] MICROORGANISM FERTILIZER, A METHOD FOR MANUFACTURING THE MICROORGANISM FERTILIZER, AND A METHOD FOR UTILIZING THE MICROORGANISM FERTILIZER

[75] Inventor: Yasuhiro Goda, Hiroshima, Japan

[73] Assignee: Towakagaku Kabushiki Kaisha, Hiroshima, Japan

[21] Appl. No.: 08/044,961

[22] Filed: Apr. 8, 1993

[30] Foreign Application Priority Data

Apr. 10, 1992 [JP] Japan ..................................... 4-118094

[51] Int. Cl.⁷ ..................................................... C05F 11/08
[52] U.S. Cl. .................. 71/9; 71/6; 71/7; 71/11; 71/12
[58] Field of Search ..................... 71/6, 7, 9, 11, 71/12

[56] References Cited

U.S. PATENT DOCUMENTS 5,100,455   3/1992   Pinckard et al. ............................. 71/9
5,196,042   3/1993   Iijima ............................................ 71/6

OTHER PUBLICATIONS

Gray, Encyc. of the Bio. Sciences, pp. 5–7, 1970.

*Primary Examiner*—Tom Dunn
*Attorney, Agent, or Firm*—Koda & Androlia

[57] ABSTRACT

A microorganism fertilizer which causes in the soil a phenomenal multiplication of fluorescent Pseudomonas that have a superior effect in preventing the common scab of potato. The microorganism fertilizer is obtained such that medium-temperature and high-temperature Actinomycetes are used as seed bacteria and cultured while being spread/agitated in an organic substance such as livestock manure, etc. in an isolated propagation bed. The thus obtained microorganism fertilizer can be used as a countermeasure against environmental pollution.

2 Claims, No Drawings

MICROORGANISM FERTILIZER, A METHOD FOR MANUFACTURING THE MICROORGANISM FERTILIZER, AND A METHOD FOR UTILIZING THE MICROORGANISM FERTILIZER

BACKGROUND OF THE INVENTION

1. Field of the Invention

The present invention relates to a microorganism fertilizer, a method for manufacturing the fertilizer, and a method for utilizing such a microorganism fertilizer.

2. Prior Art

Conventionally, one method of preventing the common scab of the potato by means of microorganisms is to add bacteria, which are antagonistic to the pathogenic bacteria, to the soil directly. In regard to THIS method of addition of bacteria to the soil, the cell mass alone may be used, or the cell mass may be used after being fixed on CMC (carboxymethylcellulose) or sodium alginate.

However, various microorganisms are present at high densities in the soil, and despite the fact that constant control of the soil conditions is necessary, there are many difficulties involved in handling such a situation on site. As a result, it is difficult for the added antagonistic bacteria to become fixed in the soil and to multiply. Accordingly, it has not been possible to obtain a sufficient effect in terms of preventing the common scab of the potato.

Pseudomonas bacteria are known to have the ability to incorporate and break down various substances as a result of their strong oxidizing power. Such bacteria are also known to break down environmental pollutants. However, the development of methods for the mass propagation and manufacture of such bacteria has lagged behind, and currently the application of such bacteria to the cleaning of the global environment remains at the laboratory level.

SUMMARY OF THE INVENTION

Accordingly, the object of the present invention is to eliminate the above described drawbacks and to provide (a) a microorganism fertilizer which causes a phenomenal multiplication of fluorescent Pseudomonas in the soil, the Pseudomonas having a superior effect in preventing the common scab of the potato, (b) a method for continuously manufacturing such a fertilizer in large quantities, and (c) a method for utilizing such a microorganism fertilizer as a countermeasure against environmental pollution.

In order to solve the problems above, the first invention is a microorganism fertilizer which is characterized by the fact that medium-temperature and high-temperature Actinomycetes are used as seed bacteria and cultured while being spread and agitated in an organic substance such as livestock manure, etc. in an isolated propagation bed.

The second invention of the present application is a method for a continuous large-scale culturing of a microorganism fertilizer which is characterized by the fact that medium-temperature and high-temperature Actinomycetes are used as seed bacteria, and the Actinomycetes are spread and agitated and then dried and fermented in parallel operations so as to be cultured in an organic substance such as livestock manure, etc. This operation is done in an isolated propagation bed. During the initial stage of culturing described above, the medium-temperature Actinomycetes are caused to multiply so that the multiplication of miscellaneous bacteria is partially suppressed, and then the temperature is maintained at 40 to 63° C. so that the high-temperature Actinomycetes are caused to multiply. A portion of the thus treated material is left in the culturing bed so that the daily culturing of seed bacteria can be omitted. Thus, in this method, the manufacturing of the microorganism bacteria is accomplished using a predetermined raw material and a predetermined bacterial strain; accordingly, a constant composition and quality can be insured.

Furthermore, the third invention is a method for utilizing the thus obtained microorganism fertilizer as a substrate (feed) that promotes the specific multiplication of bacteria which belongs to the genus Pseudomonas and has the ability to prevent soil diseases and clean the sludge and soil.

According to the invention of this patent application, antagonistic bacteria are not added to the soil. Instead, the microorganism fertilizer obtained by the present invention is utilized to cause the selective multiplication of antagonistic bacteria in the soil so as to suppress the growth of pathogenic bacteria. This is because the fertilizer of the present invention functions to accelerate the multiplication of antagonistic fluorescent Pseudomonas.

The effect of the fertilizer in suppressing the common scab of the potato was evaluated in field test. The result indicates that the plots to which the microorganism fertilizer was added showed a common scab suppression rate of 78%. Furthermore, the number of bacteria in the root soil was measured at the time of harvesting, and it indicates that antagonistic fluorescent Pseudomonas fixed in the soil had multiplied approximately 240 times more compared to the plots which is without the fertilizer of this invention.

DETAILED DESCRIPTION OF THE INVENTION

One embodiment of the first invention of this application will be described in detail below.

In order to obtain the microorganism fertilizer of the invention, ten (10) tons of pig manure (organic substance) was spread to a thickness of 20 to 30 cm on a concrete bed, and ten (10) kg of seed bacteria including high-temperature and medium-temperature manure type Actinomycetes was spread and agitated in the pig manure so as to be cultured. After ten (10) days of such a culturing, the BOD reached a minimum value, and the culturing was completed, and the objective microorganism fertilizer was obtained.

In the second method for manufacturing a microorganism fertilizer, medium-temperature and high-temperature Actinomycetes were used as seed bacteria and spread and agitated so as to be cultured in an organic substance such as livestock manure, etc. in an isolated propagation bed. During the initial stage of culturing, the medium-temperature Actinomycetes were caused to multiply so that the multiplication of miscellaneous bacteria was partially suppressed. Then, the temperature was maintained at 40 to 63° C. so that the high-temperature Actinomycetes were selectively caused to multiply. In this method, fermentation and drying were performed in parallel; as a result, drying proceeded from the surface of the livestock manure, and hyphae of the Actinomycetes were successively caused to multiply even in the interior of the livestock manure.

In addition, a portion of the treated substance was left in the propagation bed so that the daily culturing of seed bacteria can be omitted. Thus, the microorganism fertilizer is continuously cultured in large quantities.

Furthermore, in the method for utilizing the microorganism fertilizer thus obtained, the addition of such a microorganism fertilizer in a test conducted in the field on the prevention of the common scab of the potato showed a 240-time multiplication of antagonistic fluorescent Pseudomonas living in the soil compared to the plots with no such a fertilizer. As a result, a 78% suppression of the common scab was observed.

In addition, in the laboratory, Pseudomonas in sludge multiplied approximately 20-times when the microorganism fertilizer obtained as described above was added. At the same time, there was a rapid reduction in the volume of the sludge, and furthermore a reduction in $H_2S$, $NH_3$ and other organic substances, which causes the sludge to have an unpleasant odor, was also observed.

As described above, the microorganism fertilizer according to the present invention accelerates the multiplication of the Pseudomonas which produces antibiotics and iron chelate siderophores that are pathogenic to plants and act to effect the biodegradation of organic substances, etc. Thus, it can be used not only for the prevention of soil diseases but also as an agent for the amelioration of sludge contamination on lake bottoms and the sea floor, etc. and of soil contamination which is a problem in areas where improvements have been made. Furthermore, by using the microorganism fertilizer of the present invention, damages to the ecosystem which might be caused by the excessive use of chemical fertilizers or agricultural chemicals can be avoided. Moreover, the fertilizer of the present invention can biologically degrade chemical substances which are difficult to break down.

In addition, the microorganism fertilizer of the present invention is free of any unpleasant odor and the unclean feeling of conventional barnyard manure. Thus, it is well commercially marketable. Furthermore, since the fertilizer of the present invention does not impede the growth of crops, the fertilizer is extremely beneficial in that it can solve various problems arising in the fields of agriculture and stockbreeding industries.

I claim:

1. A method for manufacturing a microorganism fertilizer comprising the steps of adding medium-temperature and high-temperature Actinomycetes as seed bacteria to an organic substance, culturing, spreading and agitating said medium and high-temperature Actinomycetes and said organic substance in an isolated propagation bed to cause said medium-temperature Actinomycetes to multiply during an initial stage of culturing so that the multiplication of miscellaneous bacteria is partially suppressed, and then raising and maintaining a temperature of said organic substance at 40 to 63° C. so that said high-temperature Actinomycetes are selectively caused to multiply.

2. A method according to claim 1, wherein said organic substance is livestock manure.

* * * * *